United States Patent [19]

Jamnik

[11] 4,365,315
[45] Dec. 21, 1982

[54] SYSTEM FOR MULTILINGUAL COMMUNICATION OF COMPUTER-SPECIFIED AURAL OR VISUAL CONTROL MESSAGES IN AN OPERATOR-DESIGNATED LANGUAGE

[75] Inventor: Donald J. Jamnik, Wauwatosa, Wis.

[73] Assignee: Kearney & Trecker Corporation, Milwaukee, Wis.

[21] Appl. No.: 185,240

[22] Filed: Sep. 8, 1980

[51] Int. Cl.³ .................. G06F 15/46; G06F 15/38; G06F 15/16; G06F 3/16
[52] U.S. Cl. .................. 364/900; 179/1 SM; 364/419; 364/146; 364/147; 340/692; 340/384 E
[58] Field of Search ... 364/200 MS File, 900 MS File, 364/419, 146, 147; 340/517, 691, 692, 735, 384 R, 384 E, 825.06, 825.15, 825.22, 825.23, 825.25; 179/1 SM

[56] References Cited

U.S. PATENT DOCUMENTS

| | | | |
|---|---|---|---|
| 4,060,848 | 11/1977 | Hyatt | 364/200 |
| 4,122,533 | 10/1978 | Kubinak | 364/900 |
| 4,124,843 | 11/1978 | Bramson et al. | 364/900 |
| 4,130,882 | 12/1978 | Swanstrom et al. | 364/900 |
| 4,193,119 | 3/1980 | Arase et al. | 364/900 |
| 4,245,308 | 1/1981 | Hirschman et al. | 364/200 |
| 4,319,336 | 3/1982 | Anderson et al. | 364/900 |
| 4,328,562 | 5/1982 | Hashimoto et al. | 364/900 |

FOREIGN PATENT DOCUMENTS

| | | | |
|---|---|---|---|
| 3231671 | 4/1973 | Australia . | |
| 2740873 | 3/1979 | Fed. Rep. of Germany . | |
| 2104315 | 4/1972 | France . | |
| 2434440 | 3/1980 | France | 434/157 |
| 1448211 | 9/1976 | United Kingdom | 364/900 |

OTHER PUBLICATIONS

K. Hawley, W. Lange, & F. O'Rourke—Multiple Language Display for Terminals—IBM Technical Disclosure Bulletin, vol. 18, No. 8, Jan. 1976, p.2560.

Primary Examiner—James D. Thomas
Assistant Examiner—Archie E. Williams, Jr.
Attorney, Agent, or Firm—Cyril M. Hajewski; Robert B. Levy

[57] ABSTRACT

Multilingual computer-specified control messages are communicated to an operator in an operator-selected language by the combination of a message writer and a language changer. The language changer contains a set of message storage tables, each containing a set of control messages written in a particular language, and a set of message address tables, each message address table referencing a computer-generated message code indicative of a specific condition to a respective one of the control messages in an associated message location table. In accordance with an operator command indicative of a desired control message language, the language changer supplies the message writer with the corresponding message storage table and message address table. When the message writer is supplied with a computer-generated message code, it employs the message address table to translate the message code into a control message address and then transmits the control message located in the corresponding message storage table at the address obtained from the message address table to a visual display or to a voice synthesizer for communication to the operator.

6 Claims, 3 Drawing Figures

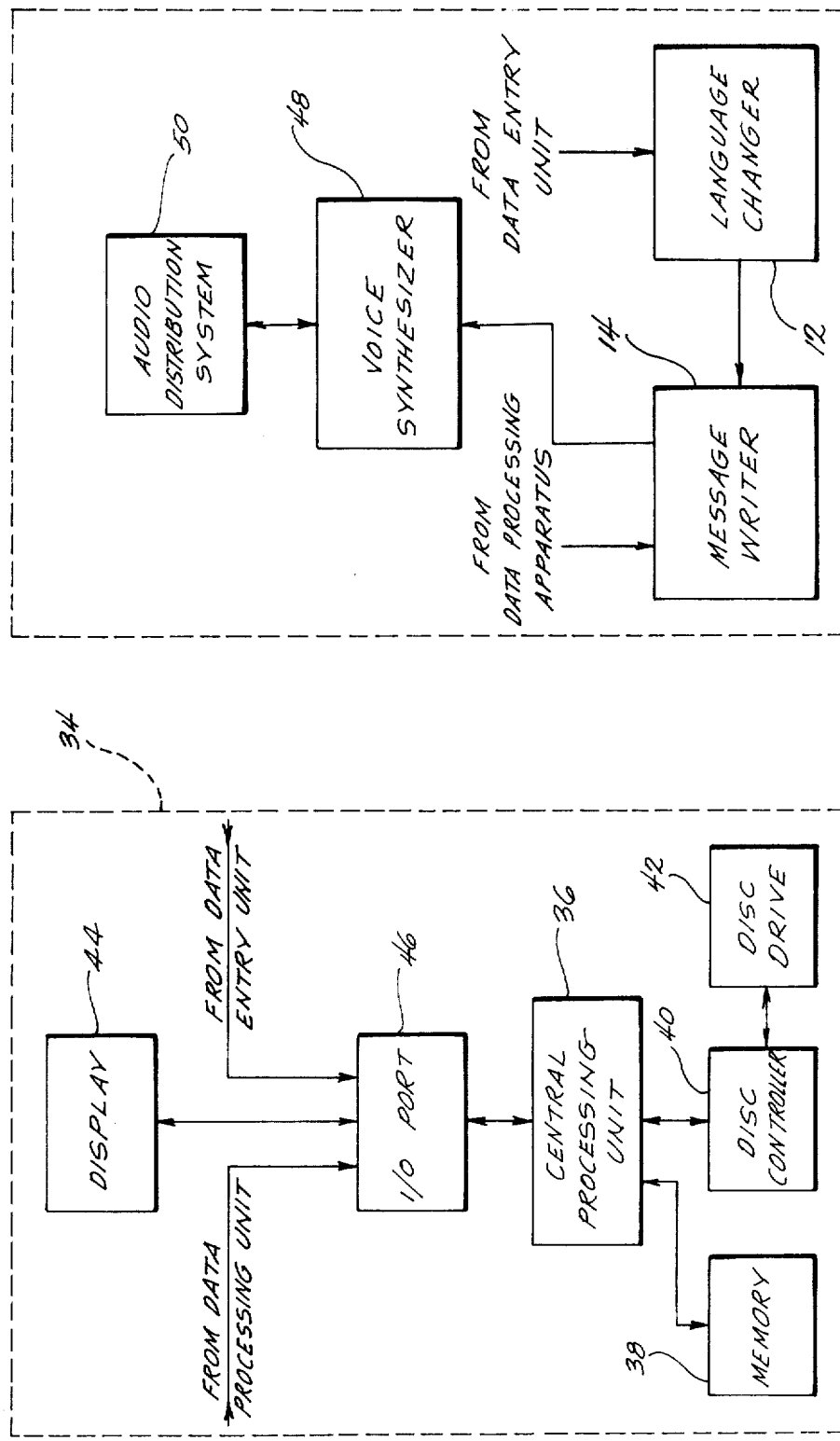

SYSTEM FOR MULTILINGUAL COMMUNICATION OF COMPUTER-SPECIFIED AURAL OR VISUAL CONTROL MESSAGES IN AN OPERATOR-DESIGNATED LANGUAGE

BACKGROUND OF THE INVENTION

This invention relates to a method and apparatus for multilingual communication of computer-specified control messages and more specifically to a method and apparatus for multilingual communication of computer-control messages in an operator-designated language.

During the operation of computer-controlled equipment, such as computer numerically controlled machine tools, it is not unusual for alphanumeric control messages to be displayed on a cathode ray tube or a light emitting diode display at periodic intervals to apprise the operator of system conditions and to elicit a response thereto. Such alphanumeric control messages are most often displayed in the English language. While display of English language alphanumeric control messages incurs no difficulty when the machine tool operator is conversant in English, display of English language control messages is most certainly disadvantageous when the machine tool operator is not conversant in English. In fact, communication English language control messages to a non-English speaking machine tool operator presents a serious safety hazard.

Heretofore, communication of computer-specified control messages in a language other than English has required modification of the computer software to enable communication of control messages in a language other than English. Communication of computer-specified control messages in each of several languages requires several different versions of computer software, each being resident in the computer memory at all times, thereby increasing the required size of the computer memory as well as decreasing computer efficiency.

It is an object of the present invention to provide a method and apparatus for multilingual communication of computer-specified control messages.

It is another object of the present invention to provide a method and apparatus for multilingual communication of computer-specified control messages in an operator-selected language.

It is yet a further object of the present invention to provide a method and apparatus of multilingual transmission of computer-specified control messages which does not require modification of the computer software.

BRIEF SUMMARY OF THE INVENTION

Briefly, in accordance with a preferred embodiment of the invention, an apparatus for multilingual communication of computer-specified control messages in an operator designated language includes a language changer comprised of a microcomputer which controls a memory storage device containing a plurality of pairs of message storage tables and message address tables. Each message storage table contains a set of control messages written in a particular language, such as French, German, Swedish, etc., with each control message in each message storage table being identified by a unique address. The message address table of each pair of message address and message storage tables contains pairs of message codes and message addresses, each message address in each message storage table referring to the address which identifies that control message contained in the message storage table which corresponds to the message code. In accordance with a command indicative of an operator-designated control message language, the language changer transmits the corresponding pair of message storage message address tables to a message writer, which typically comprises a microcomputer. The message writer is responsive to message codes generated by a data processing apparatus in accordance with system conditions, and in accordance with a message code which indicates a particular condition, the message writer utilizes the transmitted message address table to translate the message code into a message address. From the message storage table, the message writer retrieves the control message located at the address previously obtained from the message address table and then transmits the retrieved control message to a communication apparatus which communicates the message to an operator to apprise the operator of the particular condition. Communication of control messages in any other language is easily facilitated by transmitting the appropriate message address table and message location pair to message writer from the language changer.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference of the following description taken in conjunction with the accompanying drawings in which:

FIG. 2 is a block diagram of an alternate preferred embodiment of an apparatus for multilingual communication of computer-specified control messages; and FIG. 3 is a block diagram of a modified version of the apparatus illustrated in FIG. 1.

DETAILED DESCRIPTION OF THE PREFERRED EMBODIMENTS

Figure 1:
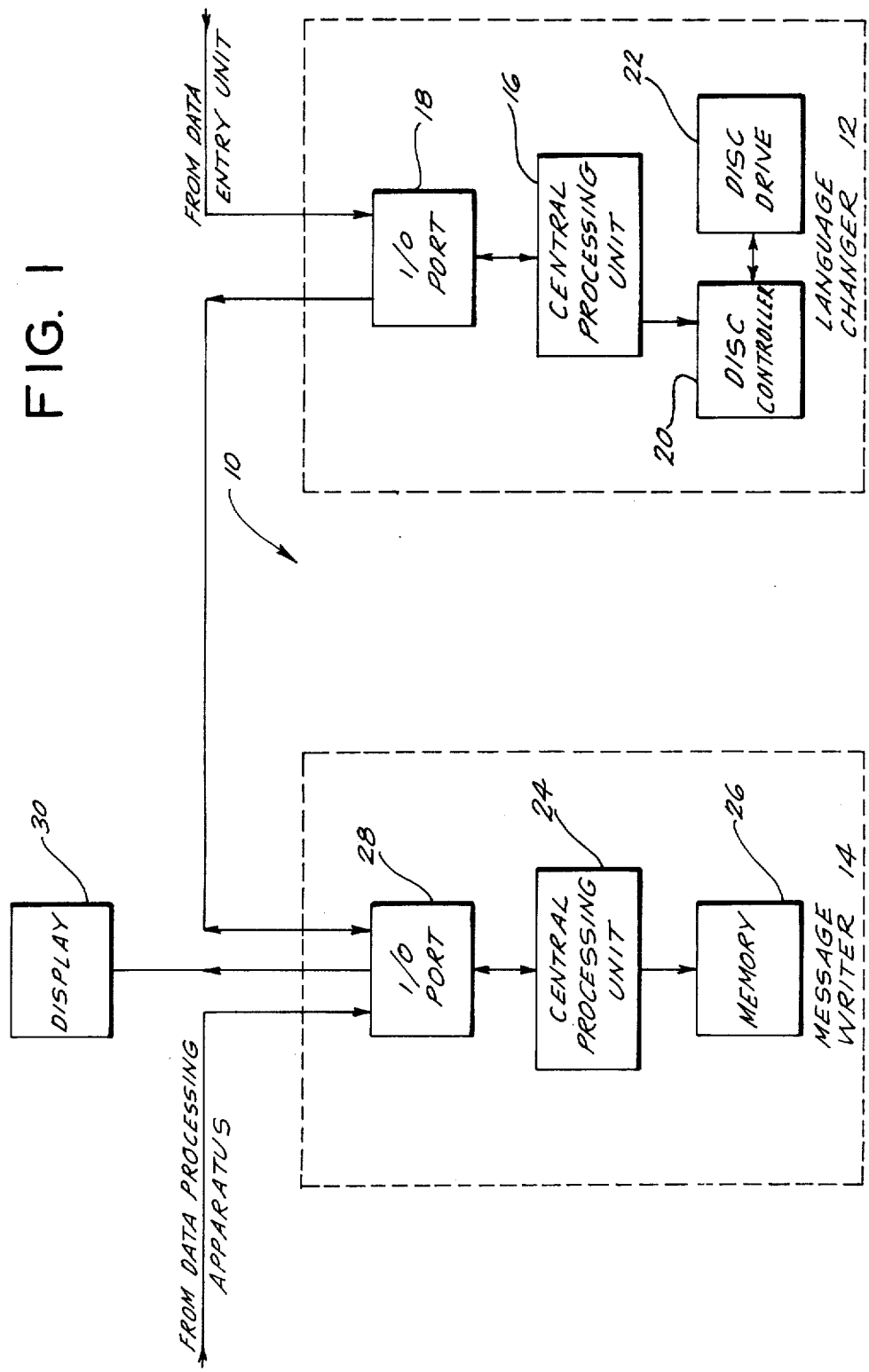
FIG. 1 is a block diagram of a preferred embodiment of an apparatus for multilingual communication of computer-specified control messages.

FIG. 1 illustrates a preferred embodiment 10 of an apparatus for communicating multilingual control messages to an operator responsive to message codes generated by a data processing apparatus, such as the control system of a numerically controlled machine tool. Apparatus 10 comprises a language changer 12 and a message writer 14. Language writer 12 includes a central processing unit 16, typically configured of a microprocessor such as the Model 8085 Microprocessor manufactured by Intel Corporation, or the Model 6800 Microprocessor manufactured by Motorola Corporation. Central processing unit 16 is coupled via an input/output port 18, such as is well-known in the art to message writer 14 and to data entry unit (not shown) through which control commands, indicative of an operator-designated language for the communication of control messages, are entered to central processing unit 16. Coupled to central processing unit 16 is a disk controller 20 which, in response to commands from central processing unit 16, controls the operation of a magnetic disk drive 22. Disk 22 stores a plurality of pairs of message storage tables and message address tables entered thereto at the outset of operation. Each pair of message storage and message address tables corresponds to a particular language such as English, French, German and Swedish, to name a few. The message storage table of each pair of tables contains a set of control messages written in a particular language with each control message in each table identified by a unique address. The message address table of each pair of tables contains a set of computer codes, each corresponding to a particular condition of which the operator should be apprised, and a set of control message addresses. Each control message address corresponds to a particular message code, and each control message address identifies the location of the control message in the message storage table of the pair of message storage and message address tables which corresponds to the message code. Each message address table thus serves as a map to cross reference a message code generated by the data processing apparatus indicative of a particular condition of the control message which announces the nature of this condition.

Message writer 14 comprises a central processing unit 24, typically configured of a microprocessor, which is coupled to a memory 26, typically configured of a semiconductor random access memory (RAM) or a bubble memory. An input/output port 28, configured identically to input/output port 18, couples central processing unit 24 to language changer 12 and to a display 30, typically configured of a cathode ray tube (CRT) or light emitting diode (LED) display. Input/output port 28 also couples central processing unit 24 to a data processing apparatus (not shown).

In operation, a command indicative of an operator-designated control message language is transmitted from the data entry unit to the central processing unit 16 of language changer 12 via input/output port 18. In response, central processing unit 16 transmits the message storage table and message address table pair corresponding to the designated control message language from disk 22 to input/output port 28 of message writer 14 for subsequent storage in memory 26. Central processing unit 24 of message writer 14, when supplied with a particular message code from a data processing apparatus, first translates the message code into a message address in accordance with the message address table stored in memory 26. From the message storage table now stored in memory 26, central processing unit 24 retrieves the control message whose address corresponds to the address previously obtained from the message address table. Central processing unit 24 then transmits the retrieved control message to display 30 via input/output port 28. In this manner, the control message corresponding to the data processing message code is transmitted to an operator in the language he or she selected.

It should be noted that central processing units 16 and 24 of language changer 12 and message writer 14, respectively, can also each be configured of a minicomputer or a main frame computer rather than a microprocessor, as described. Further, display 20 can, if desired, be configured of a printer rather than a CRT or LED display.

Referring now to FIG. 2, there is shown an alternate preferred embodiment 34 of an apparatus for multilingual display of control messages comprising a single central processing unit 36, typically configured of a high level microprocessor, such as a Model 8086 Microprocessor as manufactured by Intel Corporation, or a mini or main frame computer. Central processing unit 36 is coupled to a memory 38 configured identically to memory 26, illustrated in FIG. 1, and to a disk controller 40 which controls a disk drive 42, disk controller 40 and disk drive 42 being configured identically to disk controller 20 and disk drive 22, respectively, both illustrated in FIG. 1. As with disk drive 22, illustrated in FIG. 1, disk drive 42 contains a plurality of pairs of message storage tables and message address tables, as previously described. An input/output port 46 couples central processing unit 36 to a display 44 which is comprised of either a CRT or a LED display, or a printer. Input/output port 46 also couples central processing unit 36 to a data entry unit (not shown) through which commands, indicative of an operator-designated control message language, are entered, and to a data processing apparatus (not shown) which generates message codes indicative of various system conditions which require operator response.

In operation, central processing unit 36 performs the combined functions of language changer 12 and message writer 14, illustrated in FIG. 2. Thus, in response to a command indicative of an operator-designated control message language, central processing unit 36 retrieves from disk drive 42, the message storage table and associated message address table pair corresponding to the designated control message languages, which pair of tables are then stored in memory 38. Upon receipt from the data processing apparatus of a message code indicative of a particular condition, central processing unit 36 translates the message code into a message address in accordance with the message address table stored in memory 38 and then retrieves, from the message storage table stored in memory 38, the control message identified by the address obtained from the message address table. Thereafter, the control message is transmitted from central processing unit 36 to display 44 for display to the operator.

Configuring multilingual control message display apparatus 34, illustrated in FIG. 2, of a single, albeit more sophisticated central processing unit, in contrast to the pair of lesser sophisticated central processing units employed by multilingual control message display apparatus 10, illustrated in FIG. 1, is more advantageous as it permits simplification of hardware and reduction of the number of required components. Reduction of the number of required components, in turn, results in reduced fabrication costs.

In certain instances, it may be desirable to output the retrieved control message orally rather than visually. This can readily be accomplished by modifying the multilingual control message display apparatus of FIG. 1, as illustrated in FIG. 3, with the combination of a voice synthesizer 48 and an audio distribution system 50 being substituted for the display unit of FIG. 1. Voice synthesizer 48, typically configured of a Model SN76487N Voice Synthesizer, as manufactured by Texas Instruments, converts audio signals into control messages supplied thereto from message writer 14 which is coupled to a language changer 12. Audio distribution system 50, typically comprised of an audio amplifier coupled to a voice coil, converts the audio signals supplied thereto from voice synthesizer 48 into sound waves which may be heard by an operator.

The foregoing describes a method and apparatus for multilingual communication of computer-specified control messages in an operator-selected language. A message code generated by a data processing apparatus indicative of a particular computer condition is translated into a message address in accordance with a selected message address table. From the message address, a control message in the operator-designated language is retrieved from a selected message storage table and then the retrieved control message is communicated to an operator. Use of message storage tables and message address tables avoids the necessity of modifying computer software in order to provide multilingual display of control messages.

While only certain preferred features of the invention have been shown by way of illustration, many changes and modifications will occur to those skilled in the art. Therefore, it is to be understood that the appended claims are intended to cover all such modifications and changes as fall within the true spirit of the invention.

The principles of this invention having now been fully explained in connection with the foregoing, I hereby claim as my invention:

1. A control system for communicating messages from a computer controlled system to an operator in an operator selected language which messages are indicative of the operation of said computer controlled system comprising;

data receiving means coupled to said computer controlled system for receiving message codes from said computer controlled system indicative of the particular message to be communicated to an operator to apprise the operator of a particular state of operation of the computer controlled system;

selector means responsive to operator commands for generating a language code indicative of an operator selected language in which messages indicative of computer controlled system operation are to be communicated to said operator;

language changer means coupled to said selector means for storing a plurality of message address tables, each containing a plurality of message codes and addresses for cross referencing a particular message code to a corresponding address identifying the storage location of a corresponding message written in a particular language and said language changer means extracting a one of said message address tables in accordance with said selector means language code for cross referencing message codes to the storage addresses of those messages written in the operator designated language;

message writer means coupled to said data receiving means and to said language changer means for storing a plurality of message storage tables, each containing a set of messages written in a particular language which are each stored at a unique address and for extracting from a particular one of said message storage tables the message stored at the address determined from said extracted one of said message address tables in accordance with the message code received from said computer controlled system; and communication means for communicating said extracted message to said operator.

2. The invention according to claim 1 wherein said language changer means comprises;

a memory for storing said plurality of message address tables; and a processing unit responsive to the language code generated by said selector means in accordance with said operator designated language for extracting said one of said message address tables from said memory.

3. The invention according to claim 1 wherein said language changer means comprises:

a memory for storing said plurality of message storage tables; and processing means for extracting from said one of said message storage tables, the message stored at the address determined from said extracted one of said message address tables in accordance with said message code received from said computer controlled system.

4. The invention according to claim 1 wherein said communication means visually communicates said messages to said operator.

5. The invention according to claim 1 wherein said communications means includes a voice synthesizer for aurally communicating said messages to the operator.

6. A method for communicating a message from a computer controlled system to an operator in an operator designated language comprising the steps of:

providing a plurality of message address tables each cross referencing a particular message code generated by the computer controlled system in response to a particular computer controlled system condition to the address of a stored message in an operator designated language which is indicative of this condition;

providing a plurality of message storage tables each containing a set of messages each in a particular language and each stored at a unique address;

extracting a selected one of said message address tables whose addresses represent the storage locations of messages in a language designated by an operator;

extracting a message from a particular one of said message storage tables which is located at the address determined from said selected message address table in accordance with the message code from said computer controlled system; and communicating said extracted message to the operator.

* * * * *